(12) United States Patent
Olczak

(10) Patent No.: US 7,106,517 B2
(45) Date of Patent: Sep. 12, 2006

(54) DISPLAY OPTICAL FILMS

(75) Inventor: Eugene George Olczak, Glenville, NY (US)

(73) Assignee: General Electric Company, Schenectady, NY (US)

( * ) Notice: Subject to any disclaimer, the term of this patent is extended or adjusted under 35 U.S.C. 154(b) by 149 days.

(21) Appl. No.: 10/747,960

(22) Filed: Dec. 31, 2003

(65) Prior Publication Data

US 2005/0140860 A1  Jun. 30, 2005

(51) Int. Cl.
*G02B 5/02* (2006.01)
*G02F 1/1335* (2006.01)

(52) U.S. Cl. .............. 359/599; 359/707; 349/112
(58) Field of Classification Search .............. 359/599
See application file for complete search history.

(56) References Cited

U.S. PATENT DOCUMENTS

| | | | |
|---|---|---|---|
| 5,552,907 A | | 9/1996 | Yokota et al. |
| 5,594,830 A | * | 1/1997 | Winston et al. ............ 385/146 |
| 5,598,280 A | * | 1/1997 | Nishio et al. ............... 349/57 |
| 5,600,455 A | * | 2/1997 | Ishikawa et al. ............ 349/57 |
| 6,130,777 A | * | 10/2000 | Yamashita et al. .......... 359/456 |
| 6,354,709 B1 | * | 3/2002 | Campbell et al. ........... 362/627 |
| 6,862,141 B1 | | 3/2005 | Olczak |
| 6,952,627 B1 | * | 10/2005 | Olczak et al. .............. 700/191 |
| 2002/0024738 A1 | * | 2/2002 | Te Kolste et al. .......... 359/599 |
| 2003/0058553 A1 | | 3/2003 | Epstein et al. |
| 2003/0103760 A1 | * | 6/2003 | Gardiner et al. ........... 385/146 |
| 2003/0214728 A1 | | 11/2003 | Alczak |

FOREIGN PATENT DOCUMENTS

| | | |
|---|---|---|
| JP | 06148408 | 5/1994 |
| WO | WO 02/04858 | 1/2002 |
| WO | WO 2057816 A1 * | 7/2002 |

OTHER PUBLICATIONS

European Search Report dated Apr. 22, 2005.

* cited by examiner

*Primary Examiner*—Mark A. Robinson
*Assistant Examiner*—Mark Consilvio
(74) *Attorney, Agent, or Firm*—Foley & Lardner LLP

(57) ABSTRACT

There is provided an optical film. The optical film comprises a first surface defined by a first surface structure function modulated by a second surface structure function such that the first surface acts to diffuse light incident on the film, wherein the first surface structure function has a function of a microlens structure, and the second surface structure function has characteristics to provide the diffuse light. The optical film may be incorporated into a number of optical devices and structures.

24 Claims, 7 Drawing Sheets

Fig. 3
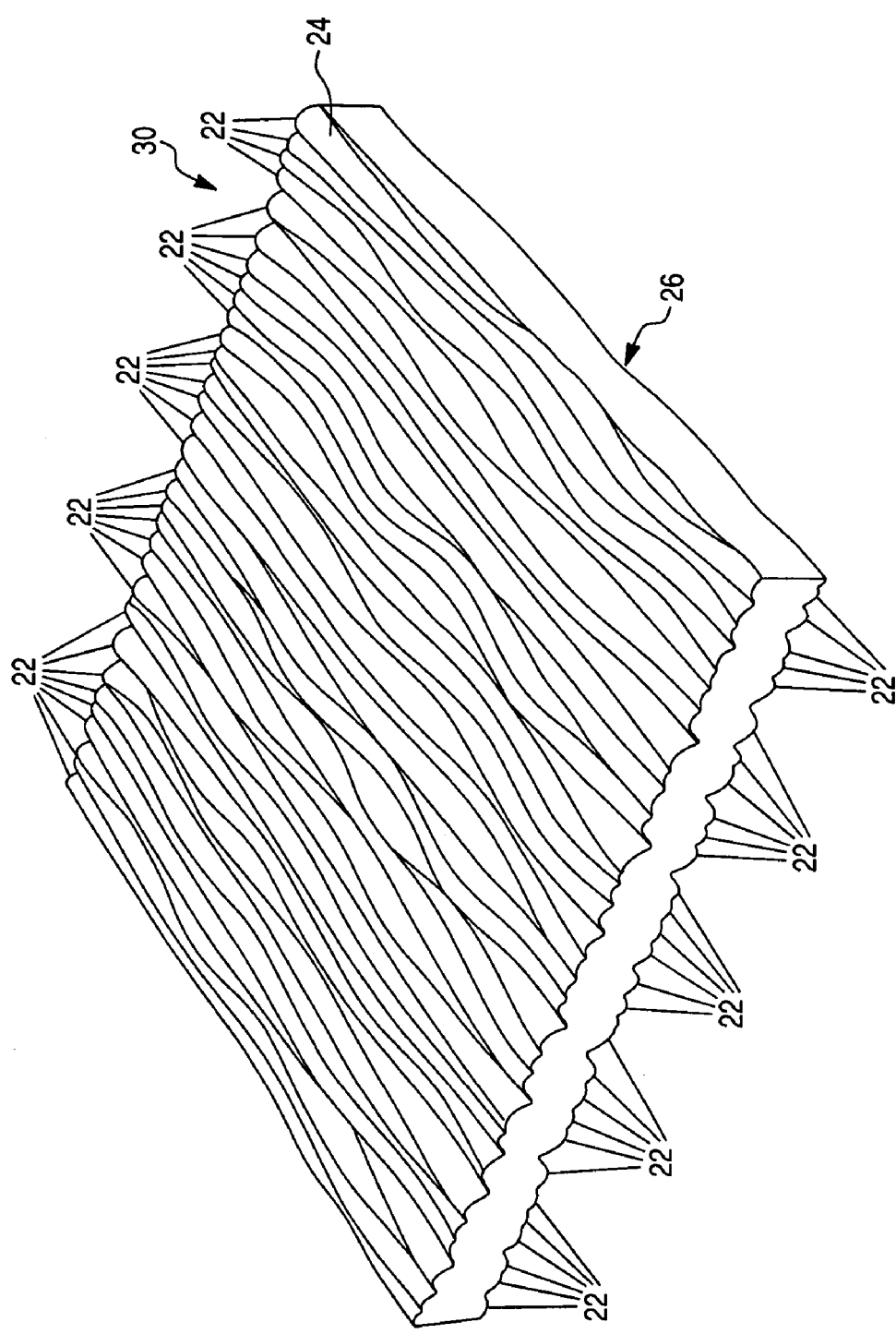
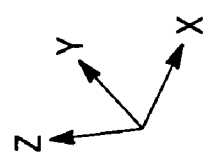

DISPLAY OPTICAL FILMS

FIELD OF THE INVENTION

This invention is related generally to display optical films including modulated microlens diffusion films, and devices incorporating such films.

BACKGROUND OF THE INVENTION

Optical devices incorporating diffusion films that diffuse light incident upon the films are known. For example, diffusion films may be added to liquid crystal display (LCD), or other display structures to diffuse light. In a typical LCD display diffusion is introduced to a backlight assembly by adding separate diffusion films.

SUMMARY OF THE INVENTION

In accordance with one aspect of the present invention, there is provided an optical film. The optical film comprises a first surface defined by a first surface structure function modulated by a second surface structure function such that the first surface acts to diffuse light incident on the film, wherein the first surface structure function has a function of a microlens structure, and the second surface structure function has characteristics to provide the diffuse light.

In accordance with another aspect of the present invention, there is provided a brightness enhancing film structure. The brightness enhancing film structure comprises a brightness enhancing film, and a light diffusing film arranged over the brightness enhancing film, the light diffusing film comprising a first surface defined by a first surface structure function modulated by a second surface structure function such that the first surface acts to diffuse light incident on the film, wherein the first surface structure function has a function of a microlens structure, and the second surface structure function has characteristics to provide the diffuse light.

In accordance with another aspect of the present invention, there is provided an optical structure. The optical structure comprises a light source, and a light diffusing film arranged over the light source, the light diffusing film comprising a first surface defined by a first surface structure function modulated by a second surface structure function such that the first surface acts to diffuse light incident on the film, wherein the first surface structure function has a function of a microlens structure, and the second surface structure function has characteristics to provide the diffuse light.

In accordance with another aspect of the present invention, there is provided a backlight display device. The backlight display device comprises a light source for generating light, a light guide for guiding the light therealong including a reflective surface for reflecting the light out of the light guide, and a light diffusing film arranged on the light guide, the light diffusing film comprising a first surface defined by a first surface structure function modulated by a second surface structure function such that the first surface acts to diffuse light incident on the film, wherein the first surface structure function has a function of a microlens structure, and the second surface structure function has characteristics to provide the diffuse light.

In accordance with another aspect of the present invention, there is provided an optical display device. The optical display device comprises a substrate comprising a source of light, a modulation array comprising a plurality of modulation elements, including liquid crystal material, arranged to modulate light received from the source of light, and a light diffusing film arranged adjacent the modulation array comprising a first surface defined by a first surface structure function modulated by a second surface structure function such that the first surface acts to diffuse light incident on the film, wherein the first surface structure function has a function of a microlens structure, and the second surface structure function has characteristics to provide the diffuse light.

In accordance with another aspect of the present invention, there is provided a backlight display device. The backlight display device comprises a light source for generating light, a light guide for guiding the light therealong including a reflective surface for reflecting the light out of the light guide, a brightness enhancing film, and a light diffusing film arranged above the brightness enhancing film, the light diffusing film comprising a first surface defined by a first surface structure function modulated by a second surface structure function such that the first surface acts to diffuse light incident on the film, wherein the first surface structure function has a function of a microlens structure, and the second surface structure function has characteristics to provide the diffuse light.

In accordance with another aspect of the present invention, there is provided a method of forming an optical film. The method comprises forming the optical film, the optical film comprising a first surface defined by a first surface structure function modulated by a second surface structure function such that the first surface acts to diffuse light incident on the film, wherein the first surface structure function has a function of a microlens structure, and the second surface structure function has characteristics to provide the diffuse light.

BRIEF DESCRIPTION OF THE DRAWINGS

FIG. 3 is a perspective view of an optical film according to another exemplary embodiment of the invention.

DETAILED DESCRIPTION OF THE PREFERRED EMBODIMENTS

Reference will now be made in detail to presently preferred embodiments of the present invention. Wherever possible, the same reference numbers will be used throughout the drawings to refer to the same or like parts.

The present inventor has realized that by applying an appropriate modulating function to the surface of a microlens structure, the microlens structure may not only redirect light, as is known for microlens structures, but may provide additional diffused light. The additional diffuse light can also beneficially prevent Moire effects caused by the microlens structures with regular periodic structures. Thus, the benefits of a microlens structure and a diffusion film may be provided in a single film.

Figure 1:
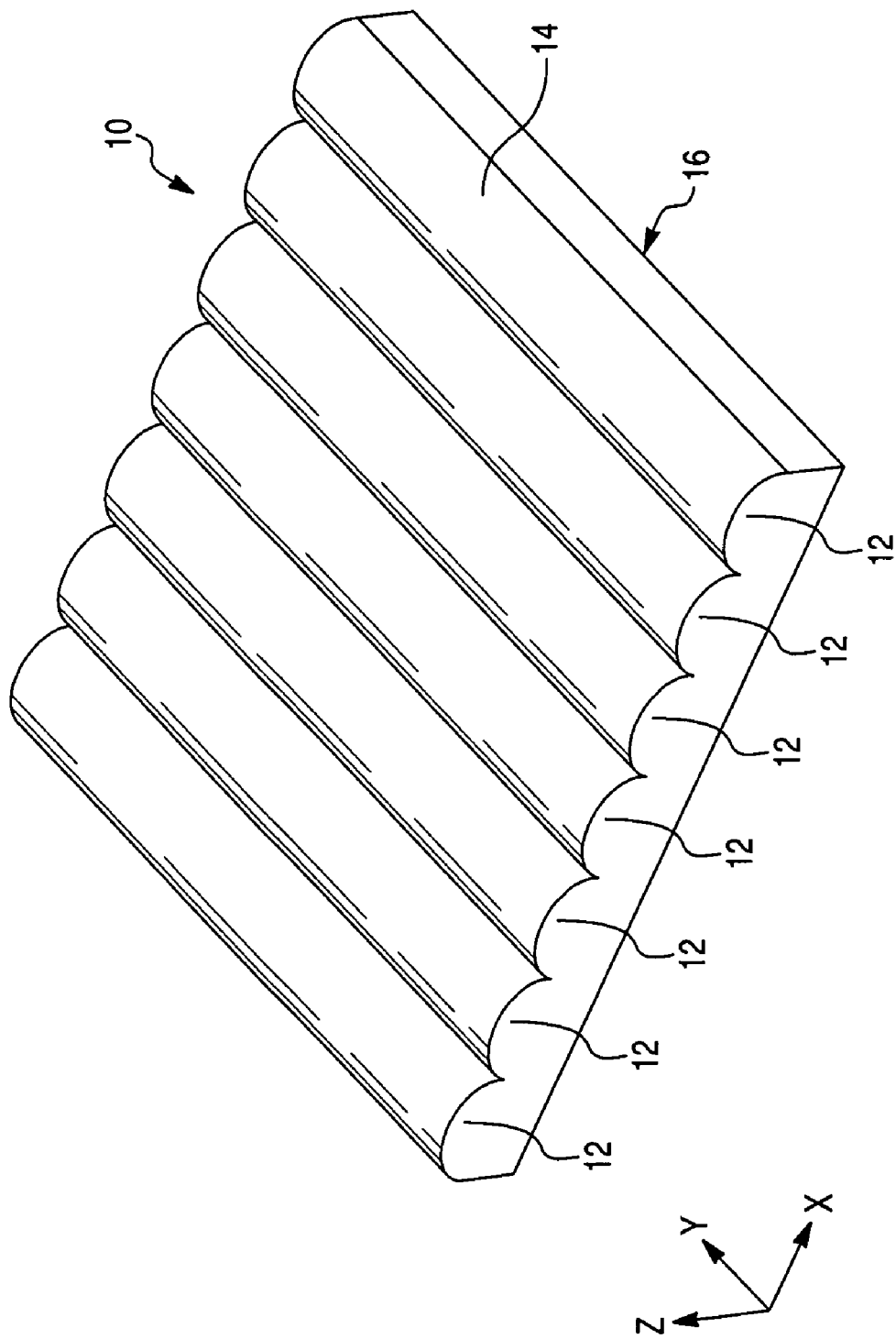
FIG. 1 is a perspective view of an optical film which comprises an unmodulated cylindrical lens microlens structure.

As background, a microlens structure without the modulating function to provide additional diffuse light will be described with respect to FIG. 1. FIG. 1 is a side view of an optical film 10 which comprises an unmodulated cylindrical lens microlens structure. The optical film 10 of FIG. 1 includes a plurality of elongated cylindrical lenses 12, the lenses being arranged with their axes in a parallel fashion along the y direction. The optical film 10 of FIG. 1 has two surfaces, a first surface 14, and second surface 16 opposite the first surface. The optical film 10 is arranged so that the cylindrical lenses 12 are on the first surface 14 in FIG. 1. Thus, the first surface is defined by a first surface structure function, wherein the first surface structure function has a function of a microlens structure, specifically in FIG. 1 a cylindrical lens microlens microstructure.

When incident light impinges upon the first surface 14, the optical film 10 acts to redirect the light by means of the cylindrical lenses 12 of the microlens structure. The first surface 14 can act to provide continuous light redirection (or blur). In this regard, the first surface may provide a light spreading function. The precise microlens shape can be used to tailor the blur, and thus the precise shape will depend upon the particular application.

Further, the first surface 14 may be highly anisotropic, such as in the case of the cylindrical lens microlens microstructure as shown in FIG. 1. This anisotropy can be useful in many applications. For example, in some displays light spreading in one viewing direction may be preferred over light spreading in another direction. In FIG. 1, the axes of the lenses 12 are oriented in the y direction, and thus light is spread preferentially in the x direction.

Figure 2:
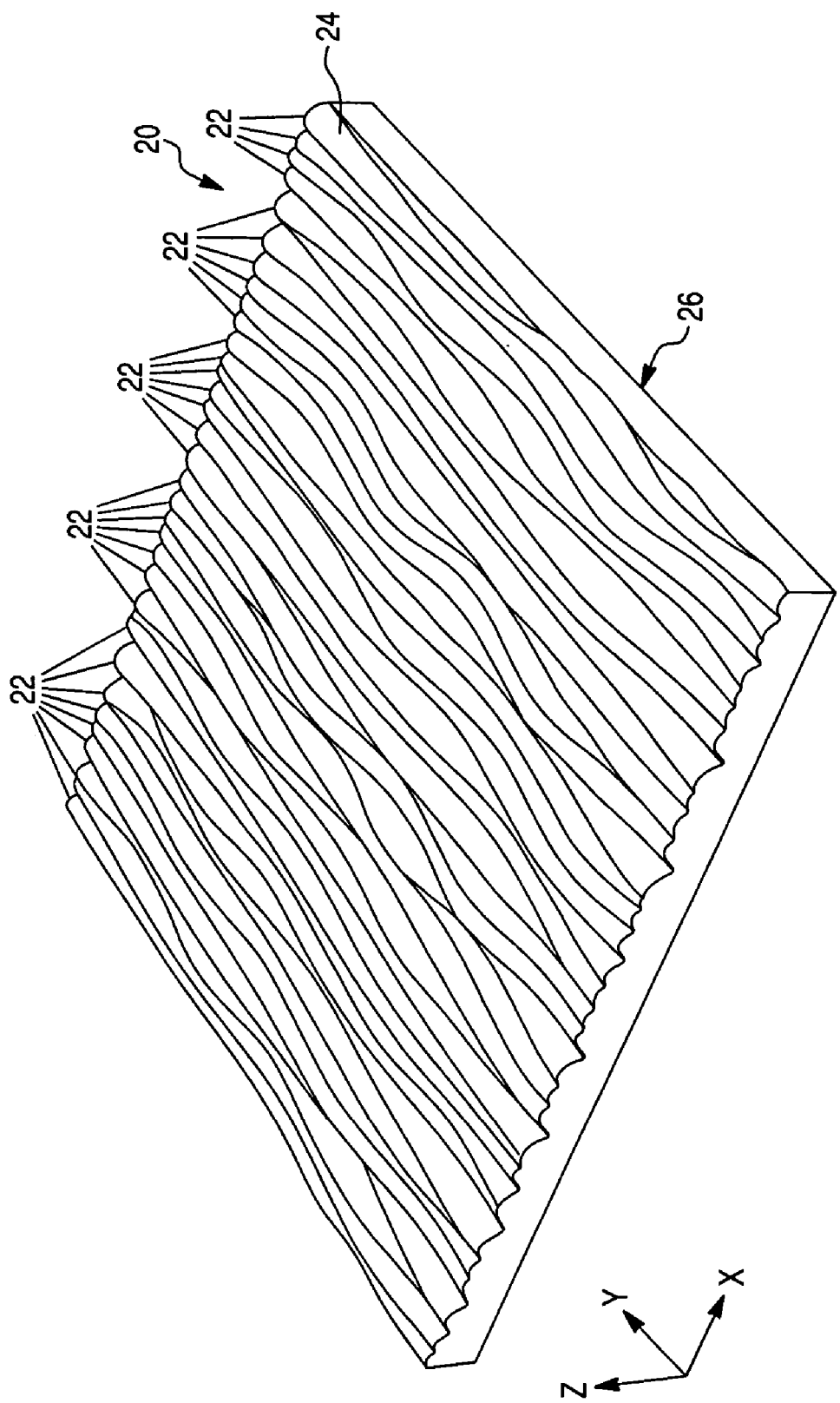
FIG. 2 is a perspective view of an optical film according to another exemplary embodiment of the invention.

FIG. 2 illustrates an optical film 20 according to an exemplary embodiment of the invention, where a first surface 24 is defined by a first surface structure function modulated by a second surface structure function, where the first surface structure function has a function of a microlens structure. The first surface structure function may be described by a function $z=f_1(x,y)$, where x and y are the Cartesian coordinates representing position along the surface in the x and y directions, respectively, of the optical film 20, and z is the Cartesian z coordinate representing the height of the first surface. Of course the first surface structure function (and second surface structure function) may be described in coordinates other than Cartesian coordiates. The second surface structure function may be described in a similar manner by a function $z=f_2(x,y)$.

The first surface structure function $z=f_1(x,y)$ defines the shape of the surface of a microlens structure, such as the structure shown in FIG. 1, for example. For the cylindrical lens microlens structure of FIG. 1, the first surface structure function $z=f_1(x,y)$ defines a repeating cylindrical lens structure, where the axes of the lens are parallel to each other and to the y axis. A surface defined by the first surface structure function alone, would act to provide continuous light redirection (blur).

The second surface structure function $z=f_2(x,y)$ has characteristics to provide additional diffuse light when the second surface structure function modulates the first surface structure function $z=f_1(x,y)$. In other words, because of the geometry imposed by the second surface structure function $z=f_2(x,y)$ on the first surface 24, the first surface 24 acts to diffuse light incident on the optical film 20. Modulating a first surface structure function with a second surface structure function, where the second surface structure function has characteristics to provide diffuse light, so as to produce a surface that acts to also diffuse light is described, for example, in U.S. patent application Ser. No. 10/150,958 to Olczak, filed on May 20, 2002 which is hereby incorporated by reference in its entirety.

The second surface structure function $z=f_2(x,y)$ modulates the first surface structure function $z=f_1(x,y)$ so as to produce an overall surface function $z=f(x,y)$ that defines the first surface 24. The second surface structure function may be a pseudo-random or random function of lens height, phase, or frequency, for example. Moreover, the combination of the first and second surface structure functions can be accomplished by way of modulating the first function by the second function so that the resulting function $z=f(x,y)$ has a pseudo-randomly varying height, phase or frequency along a direction of the film 20. Examples of specific surface structure functions are provided, for example, in U.S. application Ser. No. 10/150,958 to Olczak.

As one example of a second surface structure function, the lens height can be randomly or pseudo-randomly modulated between certain limits at random or fixed intervals along the x direction (which is perpendicular to the axes of the lenses) or along the y direction (which is parallel to the axes of the lenses), of the film 20. As best understood, the term random means true randomness or randomness to the extent possible when generated by human means, e.g., pseudo-randomness. In another example, the phase, which corresponds to the position of the lenses axes along the x direction of the first surface structure function, can be modulated, at least pseudo-randomly between certain limits along the x direction of the film 20. Furthermore, a combination of modulation techniques can be used to define the first surface 24 of the film 20 so that the first surface redirects light in a manner of a microlens structure while at the same time providing additional diffusing light.

The first and second surface structure functions may be global or pluralistic and local. As an example where the first and second surface structure functions are global, the following is provided as illustrated in FIGS. 9A–9D. Let the first surface structure function be given by $z=f_1(x,y)=A \sin(x) \sin(y)$. This function in unmodulated form results in an "egg crate" surface that can be described as a two-dimensional alternating sequence of positive and negative lenses as illustrated in the surface height image of FIG. 9A.

Now, let $R1(x,y,)$ and $R2(x,y,)$ be bandlimited random variables, which for these examples contain spatial frequencies that are lower than $\sin(x)$ and $\sin(y)$. The second surface structure function $f_2(x,y)$ can be considered to be $R1(x,y,)$, $R2(x,y,)$, or a combination. Given these three function definitions, i.e., $A \sin(x)\sin(y)$, $R1(x,y,)$, and $R2(x,y,)$, examples of the overall surface function may be given by the following exemplary equations for the overall surface function $z=f(x,y)$: $S_1=A \sin(x+R1(x,y))\sin(y)$, $S_2=A \sin(x)\sin(y+R1(x,y))$, and $S_3=A \sin(x+R1(x,y))\sin(y+R2(x,y))$, where x and y are coordinates in the x-y plane of the film, and A is a constant or another two-dimensional random variable. The exemplary surface functions $S_1$, $S_2$, and $S_3$ are shown in the surface height images of FIGS. 9B to 9D, respectively.

Returning to FIG. 2, even after the first surface structure function is modulated to produce the first surface 24 of the optical film 20, the characteristics of the first surface structure function that produce light redirection are largely retained in the resulting surface 24. The amount of additional diffusion is tunable by altering the modulation applied to the first surface structure function by the second surface structure function. For instance, an increase in the amount of modulation applied to the first surface structure function increases additional diffusion.

The amount of modulation not only adds additional diffusion, but can be used to tune the cosmetic look of the film. The amount of diffusion provided by the modulation also depends on the spatial wavelength components of the second surface structure function. Generally, as the wavelength of the modulation is decreased the texture becomes finer and diffusion increases.

Beneficially, Moiré effects due to any periodic nature of the first surface function may be reduced due to the pseudo random or random nature of the second surface function. Moiré effects may result from interferences caused by regularity in different layers of an optical structure. The optical film 20 when incorporated in an optical structure can also provide diffuse light which will tend to reduce the interference Moiré effects in other structures of the optical structure (other than the film itself).

The autocorrelation function, $R(x,y)$, is a measure of the randomness of a surface that is used in surface metrology. Over a certain correlation length, $l_c$, however, the value of an autocorrelation function, $R(x,y)$, drops to a fraction of its initial value. An autocorrelation value of 1.0, for instance, would be considered a highly or perfectly correlated surface. For example, the first surface structure function $z=f_1(x,y)$, if defining a repeating cylindrical lens structure, would have an autocorrelation value of 1.0. The correlation length, $l_c$, is the length at which the value of the autocorrelation function is a certain fraction of its initial value. Typically, the correlation length is based upon a value of 1/e, or about 37 percent of the initial value of the autocorrelation function. A larger correlation length means that the surface is less random than a surface with a smaller correlation length. A more detailed discussion of the autocorrelation function is provided in David J. Whitehouse, Handbook of Surface Metrology, IOP Publishing Ltd. (1994), p. 49–58.

In some embodiments of the invention, the value of the autocorrelation function for the first surface of the optical film drops to less than or equal to 1/e of its initial value in a correlation length of about 1 cm or less. In still other embodiments, the value of the autocorrelation function drops to 1/e of its initial value in about 0.5 cm or less. For the embodiment of the optical film 20 shown in FIG. 2, the value of the autocorrelation function along the x direction drops to less than or equal to 1/e of its initial value in about 15 µm. For the same embodiment of FIG. 2, the value of the autocorrelation function along the y direction drops to less than or equal to 1/e of its initial value in about 300 µm.

The correlation length is related to the reduction of Moiré artifacts. As noted, a smaller correlation length indicates a more random surface than a larger correlation length, and this smaller correlation length also relates to greater diffusion and the reduction of Moiré artifacts. Because the first surface of the film 20 is highly irregular, as indicated by the smaller correlation length, the film 20 can be effective to reduce Moiré artifacts.

The actual surface of the films, having characteristic dimensions of about 100 mm to 1 nm, can be generated in accordance with a number of processing techniques. These processing techniques include photolithograpy, gray-scale lithography, microlithography, electrical discharge machining and micromachining using hard tools to form molds or the like for the surface model described above.

For example, the method of making the substrates may be by mastering, electroforming and mold forming. Photolithographic Mastering may be used to direct laser write to a photoresist, a gray scale mask or a series of halftone masks that may be tiled. The photoresist may be directly removed by the laser photons or used as a precursor to an additional process step, such as reactive ion etching (RIE). Alternatively the geometry might be mastered using hard tools, such as a single point diamond tool on a five axis mill. The master will generally be made as a negative. The Substrate of the master may be glass, including fused silica, crystalline, metal or plastic (polycarbonate for example). The master may be used to mold plastic parts directly or used in electroforming.

For drum master outer diameter micromaching fabrication, the first surface function is the cross section of the tool used to scribe the outer surface of a drum. The second surface function modulates the tool path along the drum surface (compared to straight groove or thread cutting). The tool may modulated in the drum radial direction, axial direction or both.

Figure 4:
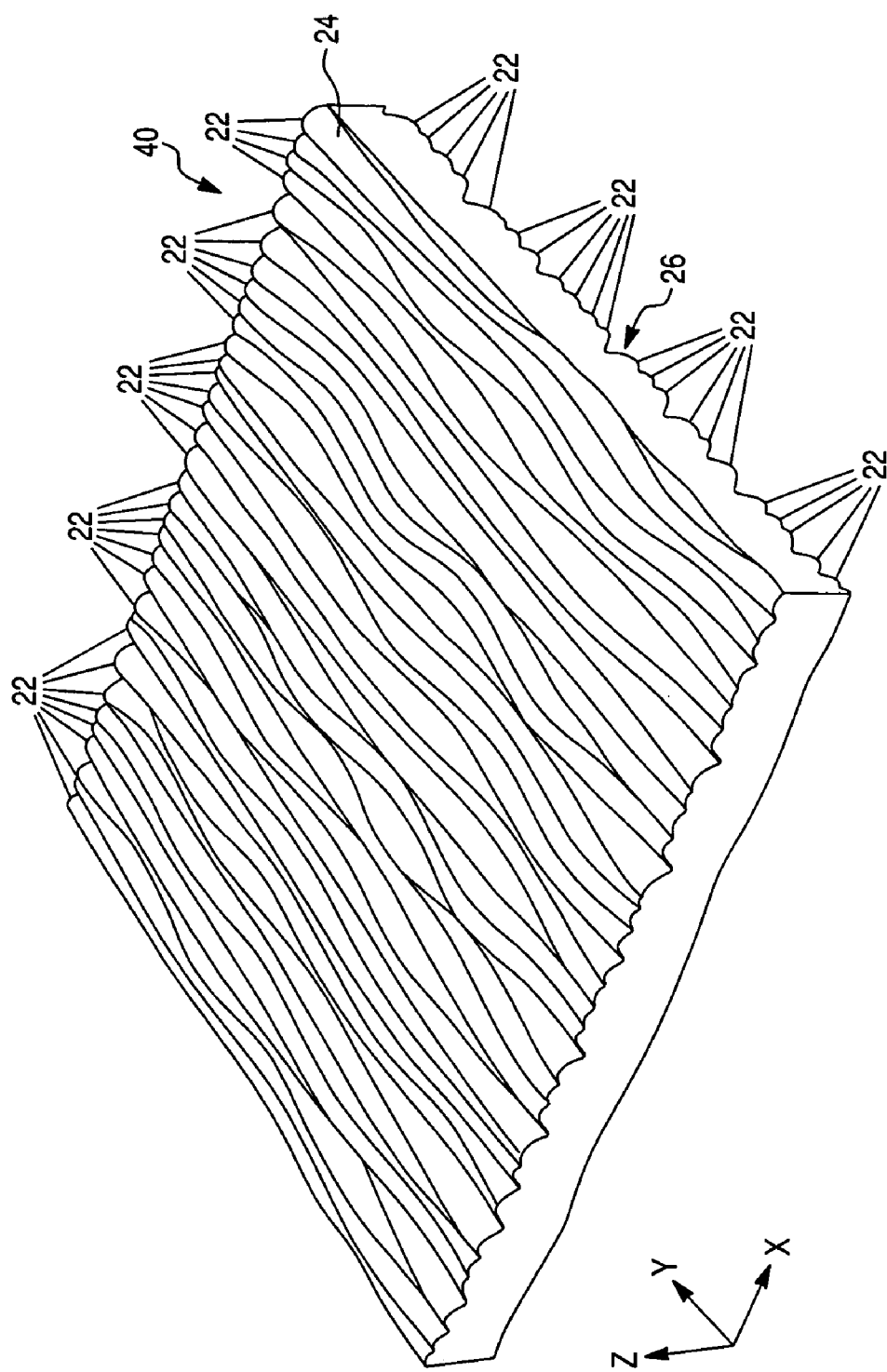
FIG. 4 is a perspective view of an optical film according to an exemplary embodiment of the invention.

The substrates shown in FIGS. 2–4 have an irregular three-dimensional surface. This irregular surface, however, is not easily defined by well known mathematical functions, as is the case for the light exiting surface 30 of FIG. 1. In these examples of FIGS. 2–4, the irregular surface can be considered to be comprised of first surface structure functions modulated each modulated by a plurality of second surface structure functions. In this regard, the first and second surface structure functions are pluralistic and local. The plurality is superimposed to form the complete first surface (or both surfaces in FIGS. 3 and 4). This type of surface can be obtained, for example, by micromachining using a single point diamond tool. For example, the first surface structure functions are given by the cross section of the diamond tool or tools and the second surface structure functions are the given by the path of the tool or tools through the surface. The tool may be modulated in a direction perpendicular to the direction in which the tool travels, either in the plane of the surface, perpendicular to the plane or both. The invention is not limited to any particular method of making the surface, however, and given the mathematical description of the surface above, any other method may be used for fabrication, such as, for example photolithography.

Electroforming is in one or two stages. The master will be a positive if only one stage is used. The master may be coated with a thin metal coating (especially if the master is not conductive to begin with). A "father" electroform is created by electro-depositing nickel on the master. This replica is again electroformed to create a "daughter" that is used to mold the plastic parts.

The object that is used to mold the device (films) is referred to as the mold. The mold may be in the form or a belt, a drum, a plate, or a cavity. The mold may be tiles from a plurality of masters or electroforms. The mold may be used to form the structures on a substrate through hot embossing of the substrate, cold calendaring of the substrate or through the addition of an ultraviolet curing or thermal setting material in which the structures are formed. The mold may be used to form the film through injection molding or vacuum forming. The substrate or coating material may be any organic, inorganic or hybrid optically transparent material and may include suspended diffusion, birefringent or index of refraction modifying particles.

The film 20 of FIG. 2 has a plurality of elongated elements 22, wherein each of the elongated elements 22 has a cross-section substantially corresponding to a cylindrical lens. The elongated elements are generally parallel in a first direction (the y direction in FIG. 2) on at least the first surface 24 of the film 20. The second surface 26, by contrast is smooth.

FIG. 3 illustrates another embodiment of an optical film 30. In the embodiment as shown in FIG. 3, both the first surface 24 and the second surface 26 comprise a plurality of elongated elements 22, wherein each of the elongated elements 22 has a cross-section substantially corresponding to a cylindrical lens. The plurality of elongated elements 22 on the first surface 24 are arranged to be generally parallel in a first direction, while the plurality of elongated elements 22 on the second surface 26 are arranged to be generally parallel in a second direction. In the embodiment as shown in FIG. 3, the first direction is generally parallel to the second direction.

Both the first surface 24 and the second surface 26 in the embodiment of FIG. 3 are defined by a first surface structure function modulated by a second surface structure function in a similar fashion to that described above with respect to FIG. 2.

FIG. 4 illustrates another embodiment of an optical film 40 similar to the embodiment as shown in FIG. 3. In the embodiment of FIG. 4, however, the first direction is generally perpendicular to the second direction. Alternative to the embodiments of FIGS. 3 and 4, the angle between the first and second directions may have any value.

While for the optical films as described with respect to FIGS. 2–4 the first surface structure function is a cylindrical lens microlens structure, alternatively, the first surface structure function (and/or second surface structure function in the embodiments of FIGS. 3 and 4) may be some other microlens structure, such as a spherical lens microlens structure, an aspherical lens microlens structure, an elliptical lens microlens structure, and a parabolic lens microlens structure. Further in the embodiments of FIGS. 3 and 4, the first surface structure function may be different for the first and second surfaces, respectively. For example, the first surface structure function may be a cylindrical lens microlens structure for the first surface, while the first surface structure function may be a spherical lens microlens structure for the second surface.

As an example of a first surface function that covers all of a first surface function for a spherical lens microlens structure, an aspherical lens microlens structure, an elliptical lens microlens structure, and a parabolic lens microlens structure, the following aspheric lens sag equation can be used.

$$z = \frac{cr^2}{1 + \sqrt{1 - (1+k)c^2 r^2}} + dr^2 + er^4 + fr^6$$

wherein z is the perpendicular deviation of the first surface function from a straight line passing through a first reference point and terminating at a second reference point both in the nominal plane of the surface and the coefficients of the polynomial lie within the following approximate ranges: $-20<c<20$; $-10<d<10$; $-10<e<10$; $-10<f<10$; $-1<k\leq 0$, and where r is a linear coordinate or distance on the line defined by the reference points in microns.

Figure 5:
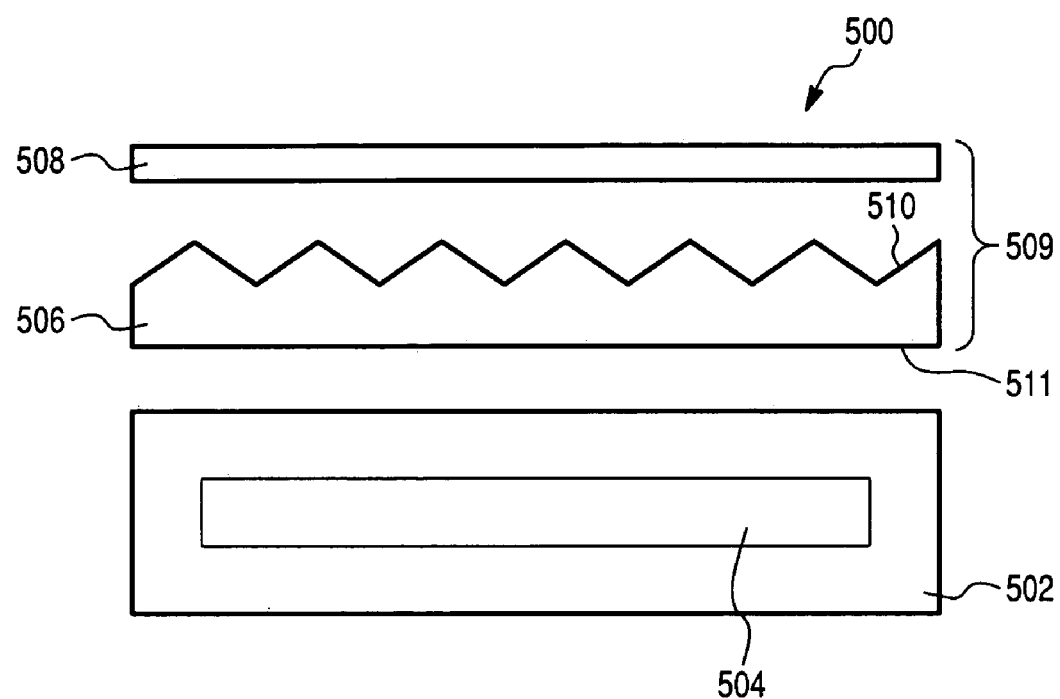
FIG. 5 is a schematic side view of an optical structure according to an exemplary embodiment of the invention.

FIG. 5 is a schematic side view illustration of an optical structure 500 including a light management structure 509 comprising a light management film 506 in addition to a light diffusing film 508 according to an embodiment of the invention. The optical structure 500 includes a light source 504 in a substrate 502, with the light management film 506 disposed above the light source 504. The substrate 502 and light source 504 may comprise a back light, for example. The light management film 506 may be a prism film, for example. In this case, the film 506 may comprise an upper prismatic surface 510 and an opposing surface 511. Alternatively, light management film 506 may be a retardation foil, diffuser film, color filter, high pass filter, band pass filter, or low pass filter, or quarter wave plate. A light diffusing film 508 is arranged over the light management film 506.

The light diffusing film 508 may be one of the optical films illustrated in embodiments of FIGS. 2–4. In this regard, the light diffusing film 508 comprises a first surface defined by a first surface structure function modulated by a second surface structure function such that the first surface acts to diffuse light incident on the film, wherein the first surface structure function has a function of a microlens structure, and the second surface structure function has characteristics to provide the diffuse light.

The light management film 506 may also provide diffusing light in one alternative. In this case the light diffusing film may in some application be dispensed with. In the case that the light management film 506 provides diffusing light, the opposing surface 511 may include a modulated microlens surface, such as the surface described with respect to the embodiments of FIGS. 2–4. If the light management film 506 is not to provide diffusing light, the opposing may simply be planar.

Figure 6:
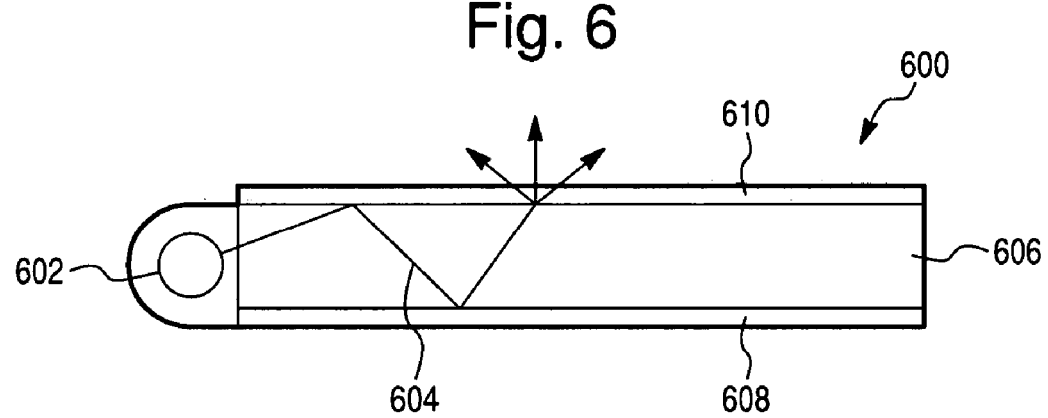
FIG. 6 is a sectional view of a back light display device according to an exemplary embodiment of the invention.

FIG. 6 illustrates a sectional view of a backlight display device 600 with a light diffusion film 610 according to an embodiment of the invention. The backlight display device 600 comprises an optical source 602 for generating light 604. A light guide 606 guides the light 604 therealong. A reflective surface 608 reflects the light 604 out of the light guide 606. The backlight display device 600 may also include an air gap between the light guide 606 and light diffusion film 610 and between the light guide 606 and reflective surface 608. Spacer beads or some other texture (not shown) allow total internal propagation in the light guide 606 by minimizing contact between the light guide 606 and the reflective surface 608 and between the light guide 606 and the light diffusion film 610.

The light diffusing film 610 is arranged on the light guide 606 and acts to diffuse light emanating from the light guide 606. The light diffusion film 610 may be one of the optical films illustrated in embodiments of FIGS. 2–4. In this regard, the light diffusing film may comprise a first surface defined by a first surface structure function modulated by a second surface structure function such that the first surface acts to diffuse light incident on the film, wherein the first surface structure function has a function of a microlens structure, and the second surface structure function has characteristics to provide the diffuse light.

Figure 7:
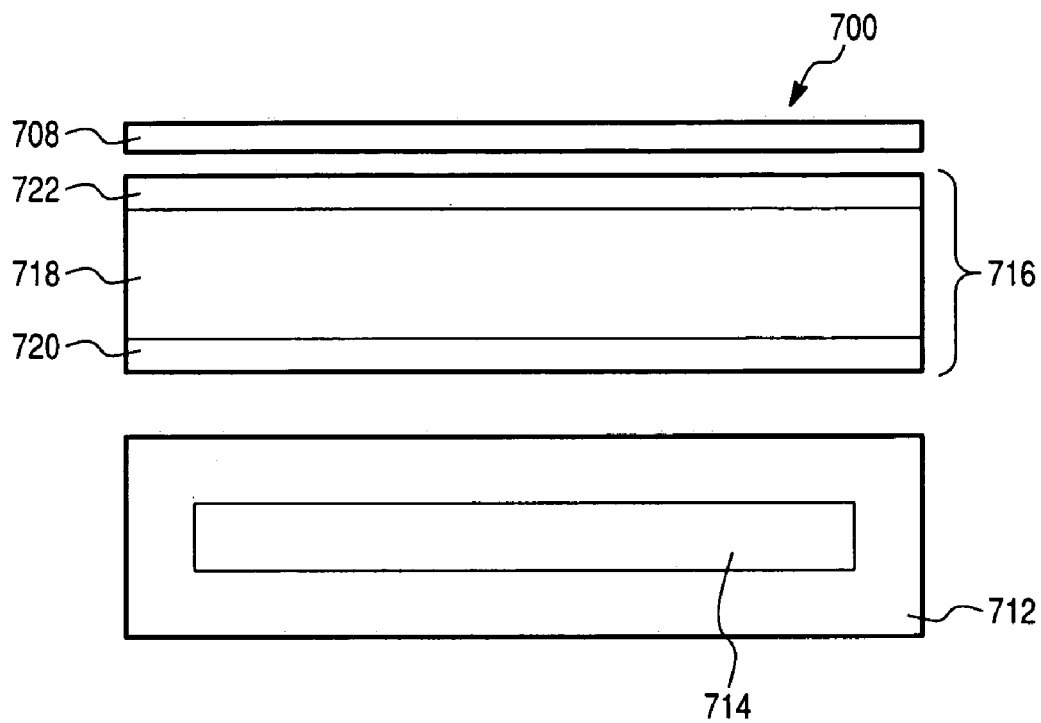
FIG. 7 is a schematic side view of an optical structure according to an exemplary embodiment of the invention.

FIG. 7 is a schematic side view illustration of an optical display device 700, such as a liquid crystal display (LCD) including a light diffusing film 708 according to an embodiment of the invention. The optical display device 700 includes a substrate 712 having a light source 714, such as a gas discharge lamp. Light from the light source 714 is incident upon a display element 716 that acts to modulate the light in pixels. The display element 716 includes a liquid crystal layer 718 between two linear polarizers 720 and 722. Regions of the liquid crystal layer 718 along with the polarizers 720 and 722 act as a light valve to selectively allow light to be transmitted from the light source 714 to the front of the LCD.

The light diffusing film 708 is arranged adjacent to the modulation array to act to provide diffuse light. For example, the light diffusing film 708 may be arranged above the display element 716 as shown in FIG. 7. Alternatively, the light diffusing film 708 may be arranged between the display element 716 and the substrate 712, for example, depending on the application.

As in the earlier described embodiments, the light diffusing film may comprise a first surface defined by a first surface structure function modulated by a second surface structure function such that the first surface acts to diffuse light incident on the film, wherein the first surface structure function has a function of a microlens structure, and the second surface structure function has characteristics to provide the diffuse light.

Figure 8:
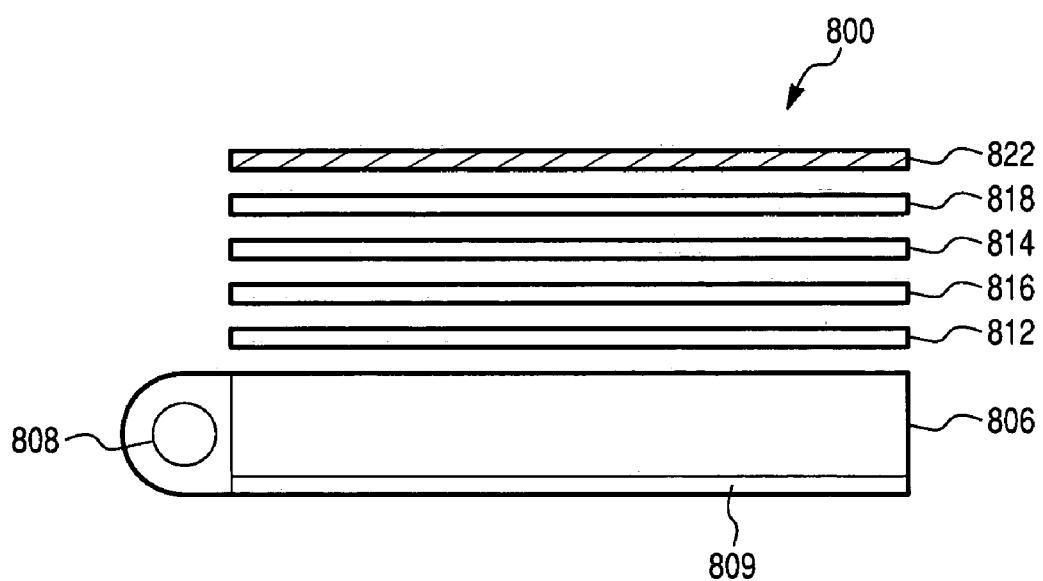
FIG. 8 is a sectional view of a back light display device according to an exemplary embodiment of the invention.
Figure 9A:
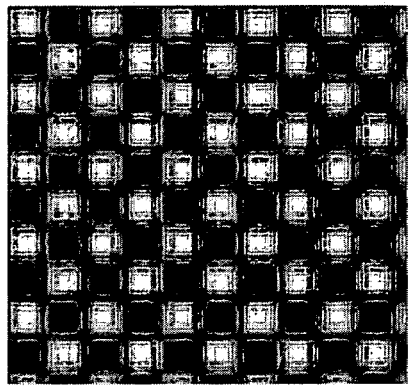
FIGS. 9A–9D illustrate a first surface structure function, and the first structure function modulated by second surface structure functions.
Figure 9B:
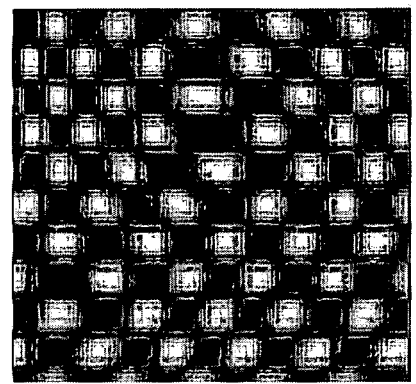
Figure 9C:
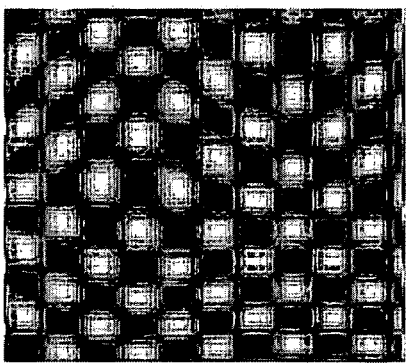
Figure 9D:
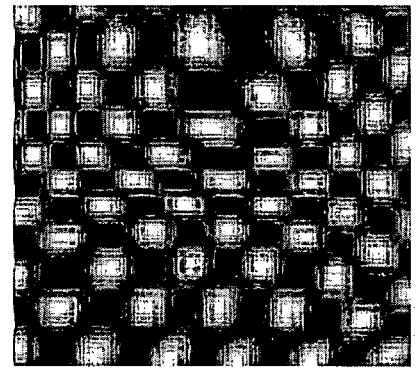

FIG. 8 illustrates a sectional view of a backlight display device 800 with light diffusion films 812, 818, a light guide 806, and LCD panel 822 according to an embodiment of the invention. The light guide 806 includes a lamp 808 and lower reflective surface 809. Layers 814 and 816 are prism films, that act to increase the brightness substantially.

The light diffusing film 818 is arranged between the prism film 814 and the LCD panel 822, while the light diffusing film 812 is arranged between the prism film 816 and the light guide 806. Beneficially, the light diffusing films 812 and 818 act to eliminate Moiré effects that may occur between the prism films 814 and 816 in certain orientations of the prism films 814 and 816 resulting from interference caused by any inherent regularity of the prism films 814 and 816.

Again, light diffusing films 812 and 818 may be one of the optical films illustrated in embodiments of FIGS. 2–4. In this regard, the light diffusing film may comprise a first surface defined by a first surface structure function modulated by a second surface structure function such that the first surface acts to diffuse light incident on the film, wherein the first surface structure function has a function of a microlens structure, and the second surface structure function has characteristics to provide the diffuse light.

While the invention has been described in detail and with reference to specific embodiments thereof, it will be apparent to one skilled in the art that various changes and modifications can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. An optical film comprising:
a first surface defined by a first surface structure function modulated by a second surface structure function such that the first surface acts to diffuse light incident on the film, wherein the first surface structure function has a function of a microlens structure, and the second surface structure function has characteristics to provide the diffuse light, wherein the first surface has a correlation function value of less than about 37 percent in a correlation length of about 1 cm or less.

2. The optical film of claim 1, wherein the first surface structure function is one of a cylindrical lens microlens structure, a spherical lens microlens structure, an aspherical lens microlens structure, an elliptical lens microlens structure, and a parabolic lens microlens structure.

3. The optical film of claim 2, wherein the first surface structure function is a cylindrical lens microlens structure.

4. The optical film of claim 2, wherein the optical film includes a first plurality of elongated elements, each having a cross-section substantially corresponding to a cylindrical lens, the elongated elements being generally parallel in a first direction on at least the first surface of the film.

5. The optical film of claim 4, wherein the optical film has a second surface opposite to the first surface, the second surface being smooth.

6. The optical film of claim 4, wherein the film has a second surface opposite to the first surface, the second surface being defined by the first surface structure function modulated by the second surface structure function, wherein the second surface has a second plurality of elongated elements, each having a cross-section of a cylindrical lens, arranged on the second surface to be generally parallel in a second direction.

7. The optical film of claim 6, wherein the first direction is generally parallel to the second direction.

8. The optical film of claim 6, wherein the first direction is generally perpendicular to the second direction.

9. A prism film structure comprising:
a prism; and
a light diffusing film arranged over the prism film, the light diffusing film comprising a first surface defined by a first surface structure function modulated by a second surface structure function such that the first surface acts to diffuse light incident on the film, wherein the first surface structure function has a function of a micro lens structure, and the second surface structure function has characteristics to provide the diffuse light, wherein the first surface has a correlation function value of less than about 37 percent in a correlation length of about 1 cm or less.

10. The prism film structure of claim 9, wherein the first surface structure function is one of a cylindrical lens microlens structure, a spherical lens microlens structure, an aspherical lens microlens structure, an elliptical lens microlens structure, and a parabolic lens microlens structure.

11. The prism film structure of claim 9, wherein the prism film comprises a plurality of raised prismatic features.

12. An optical structure comprising:
a light source; and
a light diffusing film arranged over the light source, the light diffusing film comprising a first surface defined by a first surface structure function modulated by a second surface structure function such that the first surface acts to diffuse light incident on the film, wherein the first surface structure function has a function of a microlens structure, and the second surface structure function has characteristics to provide the diffuse light, wherein the first surface has a correlation function value of less than about 37 percent in a correlation length of about 1 cm or less.

13. The optical structure of claim 12, further comprising:
a prism film arranged between the light source and the light diffusing film.

14. The optical structure of claim 13, wherein the prism film comprises a plurality of raised prismatic features.

15. A backlight display device comprising:
a light source for generating light;
a light guide for guiding the light therealong including a reflective surface for reflecting the light out of the light guide; and
a light diffusing film arranged on the light guide, the light diffusing film comprising a first surface defined by a first surface structure function modulated by a second surface structure function such that the first surface acts to diffuse light incident on the film, wherein the first surface structure function has a function of a microlens structure, and the second surface structure function has characteristics to provide the diffuse light, wherein the first surface has a correlation function value of less than about 37 percent in a correlation length of about 1 cm or less.

16. An optical display device comprising:
a substrate comprising a source of light;
a modulation array comprising a plurality of modulation elements, including liquid crystal material, arranged to modulate light received from the source of light; and
a light diffusing film arranged adjacent the modulation array comprising a first surface defined by a first surface structure function modulated by a second surface structure function such that the first surface acts to diffuse light incident on the film, wherein the first surface structure function has a function of a microlens structure, and the second surface structure function has characteristics to provide the diffuse light, wherein the first surface has a correlation function value of less than about 37 percent in a correlation length of about 1 cm or less.

17. The optical display device of claim 16, wherein the modulation array comprises a polarizer arranged below the liquid crystal material, the light diffusing film arranged on the polarizer.

18. The optical display device of claim 16, wherein the modulation array comprises a polarizer arranged above the liquid crystal material, the light diffusing film arranged on the polarizer.

19. A backlight display device comprising:
a light source for generating light;
a light guide for guiding the light therealong including a reflective surface for reflecting the light out of the light guide;
a prism film; and
a light diffusing film arranged above the prism film, the light diffusing film comprising a first surface defined by a first surface structure function modulated by a second surface structure function such that the first surface acts to diffuse light incident on the film, wherein the first surface structure function has a function of a microlens structure, and the second surface structure function has characteristics to provide the diffuse light, wherein the first surface has a correlation function value of less than about 37 percent in a correlation length of about 1 cm or less.

20. A method of forming an optical film, comprising:
forming the optical film, the optical film comprising a first surface defined by a first surface structure function modulated by a second surface structure function such that the first surface acts to diffuse light incident on the film, wherein the first surface structure function has a function of a microlens structure, and the second surface structure function has characteristics to provide the diffuse light, wherein the first surface has a correlation function value of less than about 37 percent in a correlation length of about 1 cm or less.

21. The method of claim 20, wherein the forming the optical film comprises at least one of the techniques of photolithograpy, gray-scale lithography, microlithography, electrical discharge machining and micromachining using hard tools.

22. The optical film of claim 1, wherein the first surface is defined by one of the following equations:

$$S1 = A\sin(x+R1(x,y))\sin(y),$$

$$S2 = A\sin(x)\sin(y+R1(x,y)), \text{ and}$$

$$S3 = A\sin(x+R1(x,y))\sin(y+R2(x,y)),$$

wherein x and y are coordinates in the x-y plane of the film, R1(x,y) and R2(x,y) are random variables, and A is one of a constant and a random variable.

23. A prism film comprising:
a first surface comprising a plurality of raised prismatic features; and
a second surface opposing the first surface, the second surface defined by a first surface structure function modulated by a second surface structure function such that the second surface acts to diffuse light incident on the film, wherein the first surface structure function has a function of a microlens structure, and the second surface structure function has characteristics to provide the diffuse light, wherein the first surface has a correlation function value of less than about 37 percent in a correlation length of about 1 cm or less.

24. The prism film of claim 23, wherein the first surface structure function is one of a cylindrical lens microlens structure, a spherical lens microlens structure, an aspherical lens microlens structure, an elliptical lens microlens structure, and a parabolic lens microlens structure.

* * * * *